Jan. 14, 1941.  C. C. COONS  2,228,893

REFRIGERATION

Filed Sept. 14, 1937

INVENTOR
Curtis C. Coons
BY
Harry S. Dumarer
ATTORNEY

Patented Jan. 14, 1941

2,228,893

UNITED STATES PATENT OFFICE 2,228,893

REFRIGERATION

Curtis C. Coons, North Canton, Ohio, assignor to The Hoover Company, North Canton, Ohio, a corporation of Ohio Application September 14, 1937, Serial No. 163,831

10 Claims. (Cl. 62—119.5)

It is known to provide baffling means within evaporators of refrigerating systems, but past constructions have formed liquid pools in the evaporator and have not adequately controlled the action of the inert gas stream flowing therethrough. Liquid pools have the disadvantage that they accumulate large quantities of liquid which is quiescent and is not contacted by the gas stream; also the refrigerating effect is discontinuous and uneven due to the varying area of exposed liquid surface and the spaces between adjacent liquid pools. The efficiency of the evaporator is greatly improved if turbulent conditions are introduced into the gas stream without the ill effects of collecting liquid in pools. It is an object of this invention to overcome the above noted defects of prior constructions and to provide an evaporator which will embody the above noted desirable characteristics.

My invention is explained in detail herein with reference to an evaporator for convenience of disclosure, but it is to be understood that my invention is not limited to an evaporator. For example, my invention may be applied to an absorber for refrigerating systems to produce the desirable results and advantages explained herein.

The exact operation and specific objects and advantages of my invention are explained more fully hereinafter and will become apparent as the description proceeds when taken in connection with the accompanying drawing, in which.

Figure 1:
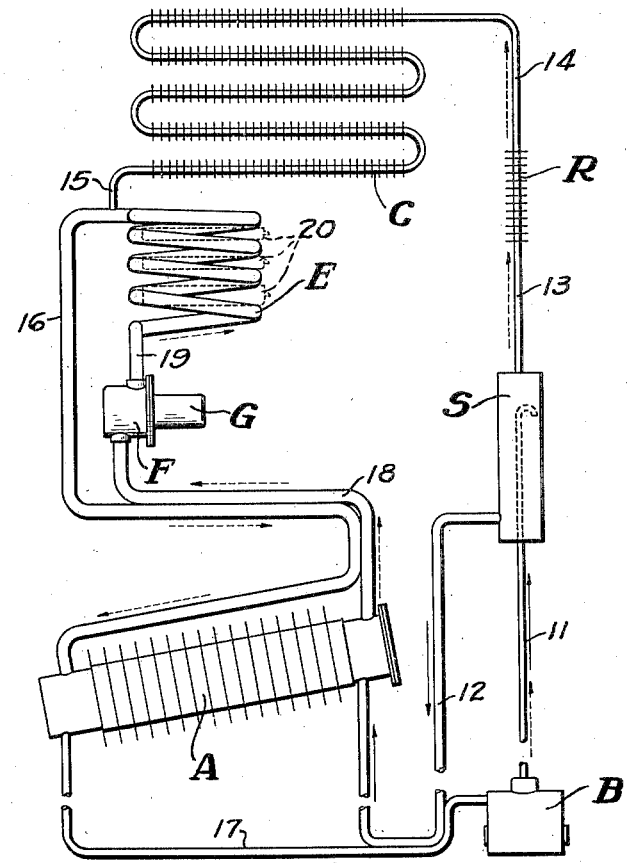
Figure 1 is a diagrammatic illustration of a three-fluid continuous absorption refrigerating system embodying my invention.

Referring now to Figure 1, it will be seen that I have diagrammatically illustrated a continuous three-fluid absorption refrigerating system comprising a boiler B, a separation vessel S, a rectifier R, a condenser C, an evaporator E, a circulating fan F driven by a motor G, and an absorber A suitably connected together by various conduits.

Heat is applied to the boiler B by any suitable means such as a gas burner or an electric cartridge heater. The boiler B contains a solution of refrigerant in an absorbent, such as ammonia in water. The application of heat to the boiler B generates ammonia vapor which functions to elevate the weakened solution through the vapor lift conduit 11 in a well known manner. Weak solution and refrigerant vapor are discharged from the conduit 11 into the chamber S where they separate and continue through their respective circuits in a manner to be described hereinafter.

Refrigerant vapor liberated in the chamber S is conducted to the rectifier R through a conduit 13 wherein entrained water vapor is condensed and flows backwardly into the separation chamber S. From the rectifier R the refrigerant vapor is conducted through conduit 14 to the condenser C, which is preferably of the continuous tube finned air cooled type, wherein it is liquefied. Liquid refrigerant is conveyed from the condenser C to the evaporator E through the conduit 15.

The weak solution collecting in the bottom of the separation chamber S flows downwardly by gravity through a conduit 12 into the upper end of an inclined air-cooled absorber A through which it flows in counterflow relationship with a mixture of inert gas and refrigerant vapor in a manner to be described more fully hereinafter.

The strong solution which collects in the lower end of the absorber A is returned to the boiler B by way of conduit 17 which is in heat exchange relation with the weak solution conduit 12 previously described.

Refrigerant vapor discharged into the evaporator E through the conduit 15 flows downwardly therethrough in counterflow relationship with a propelled stream of inert pressure equalizing medium, such as nitrogen or hydrogen, which is supplied to the lower end of the evaporator from the circulating fan F by means of a conduit 19. The evaporator E is internally constructed in a manner hereinafter to be described.

The refrigerant is evaporated in the presence of the inert gas stream in the evaporator E and is discharged therefrom through a conduit 16 which connects the upper end of the evaporator E and the lower end of the absorber A. The mixture of inert gas and refrigerant vapor travels upwardly through the absorber A, which may be internally constructed in any suitable manner, in contact with a downwardly flowing stream of weak absorption solution whereby the refrigerant vapor is separated from the inert gas by absorption. The resulting inert gas is conducted from the upper end of the absorber A to the suction side of circulating fan F by means of a conduit 18 which is in heat exchange relationship with conduit 16 previously described.

It will be understood that the boiler, separation chamber, rectifier, condenser, circulating fan, and absorber need not be constructed as illustrated herein, but may be of any suitable or desired type, the structures herein shown being selected merely for purposes of illustration.

The evaporator E is illustrated as a continuous coil of pipe and includes a number of coil elements which are adapted to receive therebetween ice freezing trays 20 in a well known manner. Of course, the evaporator will be encased in a suitable casing and will carry suitable plates for supporting the trays 20. If desired, the upper section of the evaporator may include a finned tubular box cooling section in which event the conduits 15 and 16 will discharge into this section which will in turn be connected directly into the coils of the ice freezing evaporator unit.

Figure 2:
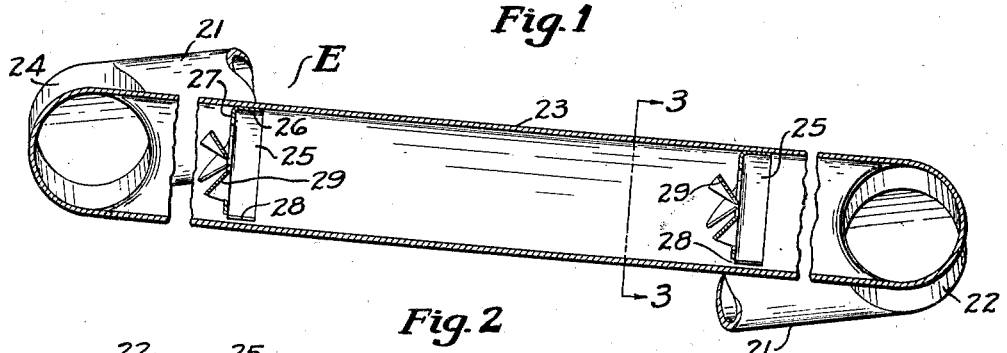
Figure 2 is a longitudinal sectional view on an enlarged scale illustrating the evaporator of my invention.
Figure 3:
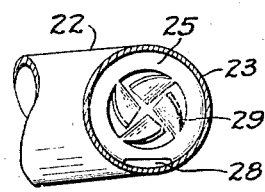
Figure 3 is a transverse cross-sectional view taken along the lines 3—3 of Figure 2 and looking in the direction of the arrows.

Referring now to Figures 2 and 3 it will be seen that the evaporator per se comprises a rectangular coil. As viewed in Figure 2, the far conduit 21 is connected to a front cross conduit 22 which in turn connects to a near side conduit 23. The rear end of the side conduit 23 is connected to a rear transverse conduit 24 which communicates with the next higher far conduit 21. It will be seen that the conduits 21, 22, 23 and 24 are continuously sloped to permit the liquid to flow downwardly therethrough by gravity.

The conduits 21 and 23, and also the conduits 22 and 24 if desired, are provided with a plurality of spaced internal baffle cups 25. Each baffle cup 25 consists of a cup-shaped metal stamping preferably of thin sheet material having a relatively high heat conductivity and resistant to corrosion induced by fluids in the evaporator. Each cup 25 comprises a cylindrical cup rim 26 engaging the inner walls of the conduits 21 and 23 and a bottom plate 27 extending transversely to the conduits 21 and 23. That portion of each baffle 25 which contacts the lowest portion of the evaporator conduit is cut out as indicated at 28 to form an unobstructed liquid passage therethrough.

The central portion of the bottom 27 of each baffle plate is provided with a plurality of gas guiding vanes 29 which are positioned to impart a helical or swirling motion to gases passing through the evaporator.

The baffles 25 are spaced a suitable distance apart to insure that gases passing through the evaporator will continuously be forced to follow a helical or swirling path.

The baffles 25 are secured in the evaporator E in any suitable manner as by welding, brazing, tinning, or pressing.

In operation, the liquid refrigerant supplied to the upper portion of the evaporator flows downwardly therethrough in a continuous stream in counterflow relation with a propelled stream of inert gas which flows upwardly through the evaporator in a continuous stream. The flow of liquid refrigerant is unobstructed by the baffles 25, but they impart a continuous swirling motion to the gas stream. The swirling motion imparted to the gas stream produces several desirable results which are a continuous wiping action on the walls of the evaporator conduit, a continuous wiping and rippling of the surface of the liquid stream, and a continuous presentation of fresh bodies of gas to the liquid refrigerant whereby the evaporation of the refrigerant is promoted and stratification in the gas stream is effectively prevented. The gas stream also tends to spread the liquid refrigerant over the inner surface of the evaporator conduit; that is, the stream of liquid refrigerant is forced to climb up one wall of the evaporator conduit in the direction of rotation of the swirling inert gas stream. This action, of course, results in better heat transfer between the liquid and the wall of the evaporator conduit due to the large area of metal-liquid contact, and it also results in a much greater area of gas and liquid contact surface. In addition to the advantages just enumerated the baffles 25 function as direct metal heat conducting devices between the inert gas stream and the outer wall of the evaporator conduit due to the fact that the gas stream forcibly strikes the bottom 27 of the baffles and wipes across the surfaces of the vanes 29.

My evaporator structure avoids pools of liquid in the evaporator while allowing efficient baffling of the inert gas stream to promote evaporation. This combines the advantages of a continuous stream of liquid refrigerant of substantially uniform cross-section with the advantages to be gained by baffling the gas stream. By forming a continuous stream of liquid refrigerant of uniform cross-section, the ratio of the area of evaporating surface to the volume of liquid is a maximum, and the refrigerating effect is uniformly distributed throughout the evaporator.

While I have illustrated and described a particular form of my invention it is to be understood that it is not to be limited thereto, but may be embodied in other constructural forms without departing from the invention except as limited by the scope of the appended claims.

I claim:

1. An evaporator for refrigerating systems comprising an inclined vessel, a plurality of baffles within said vessel, said baffles being constructed and arranged to induce turbulence in a gas stream passing therethrough without impeding the flow of liquid along the bottom side of said vessel.

2. Refrigerating apparatus comprising an elongated inclined vessel, means for supplying liquid to the upper portion of said vessel, means for supplying a pressure equalizing medium to the lower portion of said vessel, and means within said vessel constructed and arranged to allow free flow of the liquid therethrough and to impart a swirling motion to said pressure equalizing medium at a plurality of separated points.

3. A baffle for refrigerating systems comprising a sheet metal cup-shaped member having a bottom portion and a rim portion, a small liquid passing slot formed in said bottom portion and said rim portion, and a plurality of agitating elements formed in said bottom portion.

4. Refrigerating apparatus comprising an elongated inclined vessel, means for supplying a liquid to the upper end of said vessel for substantially continuous flow downwardly therethrough, means for supplying an inert pressure equalizing medium to the lower end of said vessel, means for propelling said pressure equalizing medium, and means within said vessel constructed and arranged to permit unobstructed flow of the liquid thereby and to force said stream of pressure equalizing medium repeatedly to wipe the surface of said liquid stream transversely to the direction of flow thereof and thereafter to wipe the inner wall of said inclined vessel.

5. An evaporator comprising a vessel, means for supplying liquid refrigerant to said vessel, means for supplying a propelled stream of inert gas to said vessel, means for conducting said stream of inert gas and vaporized refrigerant from said vessel, and means within said vessel constructed and arranged to direct the inert gas stream in a path such that it repeatedly wipes the surface of said liquid stream transversely to the direction of flow thereof and without obstructing the flow of such liquid refrigerant.

6. An evaporator comprising an elongated inclined vessel, means supplying liquid refrigerant to the upper end of said vessel, means for supplying a propelled stream of pressure equalizing medium to the lower end of said vessel, and means within said vessel constructed and arranged to cause said propelled stream of pressure equalizing medium to force a portion of said stream of liquid refrigerant upwardly along one wall of said inclined vessel.

7. An evaporator comprising an elongated inclined vessel of circular cross section, means for supplying liquid refrigerant to the upper end of said vessel, means for supplying a propelled stream of pressure equalizing medium to the lower end of said vessel, and means within said vessel constructed and arranged to direct the propelled stream of pressure equalizing medium in such fashion that it carries said liquid refrigerant upwardly on one side wall of said inclined vessel.

8. That improvement in the art of refrigeration which includes the steps of forming a continuous stream of liquid refrigerant, passing a stream of pressure equalizing medium thereover, and swirling the pressure equalizing medium stream about an axis substantially parallel to the direction of flow of the liquid refrigerant.

9. Refrigerating apparatus comprising a vessel, means for supplying liquid refrigerant to one end of said vessel, means for supplying a propelled stream of pressure equalizing medium to the other end of said vessel, a plurality of spaced baffle elements in said vessel, each of said baffle elements comprising a cup-shaped element of thin sheet material having a cylindrical wall portion and a circular bottom portion, the wall portion being arranged in good thermal contact with the inner wall of said vessel, a gas guiding vane formed in the bottom portion of each baffle, each baffle being formed with a cut out portion adjacent the bottom wall of said vessel to permit unimpeded liquid flow therethrough.

10. An evaporator comprising a tubular element, a plurality of spaced cup shaped baffle elements extending transversely of said tubular element, a plurality of gas guiding vanes carried by said baffle elements, and a liquid passing opening formed in the lower portion of each of said baffle elements.

CURTIS C. COONS.